United States Patent
Hardtl

[15] 3,671,765

[45] June 20, 1972

[54] ELECTROMECHANICAL RESONATOR EMPLOYING PIEZOELECTRIC CERAMIC CONSISTING OF LEAD ZIRCONATE-TITANATE CONTAINING MANGANESE MONOXIDE

[72] Inventor: Karl Heinz Hardtl, Aachen, Germany

[73] Assignee: U.S. Philips Corporation, New York, N.Y.

[22] Filed: Sept. 25, 1970

[21] Appl. No.: 75,414

[30] Foreign Application Priority Data

Oct. 7, 1969 Netherlands..........................6915115

[52] U.S. Cl...................................310/9.5, 252/62.9, 310/8

[51] Int. Cl...........................................................H01v 7/00

[58] Field of Search........................310/9.5, 9.6, 8; 252/62.9

[56] References Cited

UNITED STATES PATENTS

| | | | |
|---|---|---|---|
| 3,461,071 | 8/1969 | Akashi et al. | 252/62.9 |
| 3,549,536 | 12/1970 | Lungo et al. | 252/62.9 |

FOREIGN PATENTS OR APPLICATIONS

| | | |
|---|---|---|
| 1,077,650 | 8/1967 | Great Britain |

*Primary Examiner*—J. D. Miller
*Assistant Examiner*—B. A. Reynolds
*Attorney*—Frank R. Trifari

[57] ABSTRACT

An electromechanical resonator having a ceramic piezoelectric member consisting of MnO-containing lead zirconate-titanate of the composition $Pb(Zr_xTi_{1-x})O_3 + y$ % by weight of MnO, where $x = 0.52 - 0.58$ and $y = 0.22 - 0.40$.

4 Claims, 2 Drawing Figures

Figure 1:
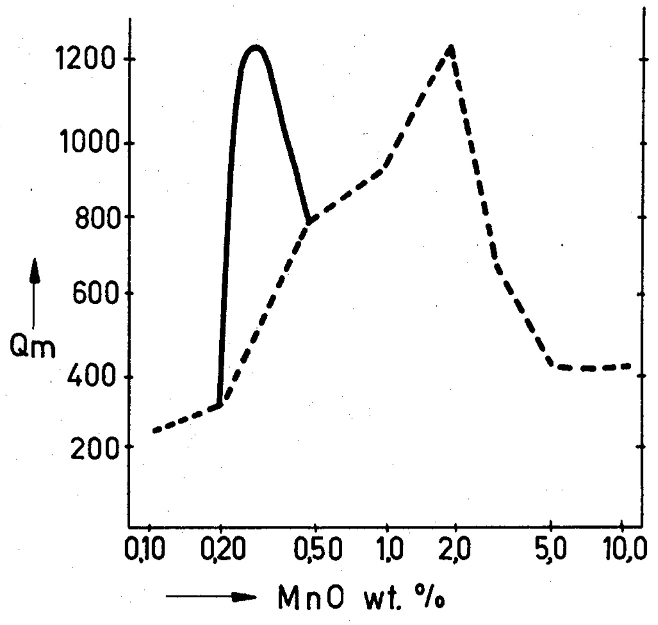

INVENTOR.
KARL H. HARDTL
BY.
AGENT.

ELECTROMECHANICAL RESONATOR EMPLOYING PIEZOELECTRIC CERAMIC CONSISTING OF LEAD ZIRCONATE-TITANATE CONTAINING MANGANESE MONOXIDE

The invention relates to an electromechanical resonator, for example, an electromechanical filter, in which a ceramic piezoelectric member is used.

It is known to use members of a ceramic piezoelectric material in electromechanical resonators. Such a material is, for example, a lead zirconate-titanate the composition of which lies on or near the transition from the tetragonal structure to the rhombohedral structure.

It is also known to improve the piezoelectric properties of such lead zirconate-titanate compositions by the addition of small quantities of oxides of other elements.

In British Patent Specification 1,077,650, for example, it is stated that a ceramic piezoelectric material of the composition $Pb(Zr_xTi_ySn_z)O_3$, wherein $x = 0.00 - 0.90$; $y = 0.10 - 0.60$; $z = 0.00 - 0.65$ and $x + y + z = 1$, to which 0.1 to 10.0 percent by weight of MnO has been added, is suitable for use in electromechanical filters. Said Patent specification states a few examples of compositions of such materials which are said to be suitable for such an application. As such are mentioned, inter alia, the following compositions.

a. $Pb(Zr_{0.52}To_{0.48})O_3 + 0.20$ % by weight of MnO;
b. $Pb(Zr_{0.52}Ti_{0.48})O_3 + 0.50$ % by weight of MnO;
c. $Pb(Zr_{0.52}Ti_{0.48})O_3 + 1.0$ % by weight of MnO;
d. $Pb(Zr_{0.52}Ti_{0.48})O_3 + 2.0$ % by weight of MnO.

For the electromechanical coupling factor (for the radial direction) $I_r$ and the electromechanical quality factor $Q_m$, the following values are given for resonators made of materials of the compositions (a) through (d), respectively:

| Composition | Kr | $Q_m$ |
|---|---|---|
| (a) | 60% | 310 |
| (b) | 52% | 810 |
| (c) | 52% | 930 |
| (d) | 43% | 1250 |

For the practical application of a ceramic piezoelectric material in electromechanical resonators and in particular in electromechanical filters, said material should fulfil a number of requirements. Inter alia, the electromechanical coupling factor (for the radial direction) $K_r$ must preferably be at least 40 percent, the electromechanical quality factor $Q_m$ must preferably be at least 900. Less stringent requirements are imposed upon the dielectric constant $\xi$; $\xi$ may be 300–700. In addition very stringent requirements are imposed upon the ageing for said practical application. On this subject the following may be remarked.

When an alternating voltage is set up at the electrodes of a piezoelectric plate, the plate will be brought into mechanical vibration, as a result of the piezoelectric behavior, with the frequency of the applied alternating voltage. For certain frequencies the plate is brought in a mechanical resonance vibration; for example, a resonant frequency exists (denoted here by $f_r$) for the radial direction for a cylindrical (circular) plate.

When used in practice (in electromechanical resonators and in particular in electromechanical filters), the value of the resonant frequency $f_r$ may not vary more than 3 percent and preferably not more than 2 percent per decade; this means that between the first and the ninth day after the polarization the value of $f_r$ may not vary more than 3 percent and preferably not more than 2 percent; the same holds good between the 10th and the 100th day after polarization.

For certain applications it is even required that the variation of $f_r$ per decade is at most 1 percent and preferably is smaller than 1 percent per decade.

It has been found that the variation of $f_r$ has a logarithmic time dependence. This involves that measurement of the resonant frequency $f_r$ on the first and on the tenth day after the polarization gives a good picture of the variation of $f_r$ with time. The variation of $f_r$ in that period, here termed ageing and denoted by $A$, can be represented in the following formula:

$$A = f_{r10} - f_{r1}/f_{r1},$$

wherein $f_{r1}$ is the value of the resonant frequency measured on the first days after polarization and $f_{r10}$ is the value for said quantity measured on the tenth day after polarization.

In as far as applicants know, the known ceramic piezoelectric materials do not fulfil the said conditions for use in electromechanical resonators.

In the said British Patent specification it is stated in a Figure for the basic composition $Pb(Zr_{0.52}Ti_{0.48})O_3$ that the electromechanical quality factor $Q_m$ first increases substantially gradually with increasing content of MnO (inter alia in the range of from 0.2 to 0.50 % by weight of MnO) to a content of MnO of approximately 2% by weight and then rapidly decreases with a further increasing content of MnO.

Quite in contrast with what might be expected on the basis of what is stated in the said British Patent specification applicants have found that in the said basic composition with increasing content of MnO in the range between 0.20% by weight and 0.50 % by weight of MnO the value of $Q_m$ does not increase gradually as is stated in said patent specification but that in said range with increasing content of MnO first a very strong increase of $Q_m$ occurs, with a maximum of $Q_m$ = approximately 1,230 with a content of MnO of 0.32% by weight, after which $Q_m$ again decreases with the content of MnO increasing.

This behavior of $Q_m$ in accordance with the content of MnO in the said basic composition $Pb(Zr_{0.52}Ti_{0.48})O_3$ is shown in the FIGURE by the solid line; the broken line corresponds to that for the behavior of $Q_m$ in accordance with the content of MnO in the same basic composition according to the Figure in the said British Patent specification.

Applicants have furthermore found that a similar relationship exists between the content of MnO and $Q_m$ in other compositions to be stated below.

Applicants have furthermore found that electromechanical resonators in which a material of the composition $Pb(Zr_{0.52}Ti_{0.48})O_3 + 0.22 - 0.40$ % by weight of MnO has been used as a ceramic piezoelectric material have very good ageing properties, that is to say, that for said resonators the absolute value of $A$ is not or only slightly larger than 1. For the electromechanical coupling factor $K_r$ values of approximately 46–57.7 percent were found; the dielectric constant $\xi$ was between 615 and 700.

Applicants have found in addition that similar or even better results can be obtained with other basic compositions for lead zirconate-titanate with a content of MnO of from 0.22 to 0.40 % by weight. For example, a material of the composition $Pb(Zr_{.54}Ti_{.46})O_3 + 0.32\%$ by weight of MnO has extremely good properties. For this material $K_r = 46.5$ percent, $Q_m = 1{,}150$, $\xi = 460$ and $A = -0.2$.

The invention relates to an electromechanical resonator consisting of a ceramic piezoelectric member provided with electrodes, said member consisting of an MnO-containing lead zirconate-titanate the composition of which is given by the formula $Pb(Zr_xTi_{1-x})O_3 + y$ % by weight of MnO, wherein $x = 0.52 - 0.58$ and $y = 0.22 - 0.40$.

The above-mentioned conditions imposed upon the quantities $K_r$, $Q_m$, $\xi$ and A are fulfilled in particular when using materials the composition of which is given by the formula $Pb(Zr_xTi_{1-x})O_3 + y\%$ by weight of MnO, where $x = 0.52 - 0.58$ and $y = 0.25 - 0.35$, and more in particular by those the composition of which is given by the formula $Pb(Zr_xTi_{1-x})O_3 + y$ % by weight of MnO, where $x = 0.52 - 0.58$ and $y = 0.30 - 0.35$.

Furthermore are to be preferred materials the composition of which is given by the formula $Pb(Zr_xTi_{1-x})O_3 + y$ % by weight of MnO, where $x = 0.53 - 0.56$ and $y = 0.22 - 0.40$.

The manufacture of the ceramic piezoelectric members was carried out in a manner known for manufacturing members consisting of lead zirconate-titanate. Starting material was a mixture composed of quantities of lead oxide (PbO), zirconium oxide ($ZrO_2$), titanium oxide ($TiO_2$) and manganese carbonate ($MnCO_3$) required for obtaining the desirable composition of the ceramic piezoelectric member. The mixture thus composed was thoroughly mixed by dry grinding in a ball mill. The resulting powder was then heated in air at 800° C for 10 hours in covered dishes consisting of densely sintered aluminum oxide. The resulting mass was then ground dry in a ball mill. Bodies were manufactured from the resulting powder by isostatic compression. These members were placed in platinum-coated, covered dishes consisting of densely sintered aluminum oxide and heated in an oxygen atmosphere at 1,300° C for one hour. In order to avoid loss of PbO a member consisting of lead-zirconate which has a comparatively high PbO pressure was provided in the dishes.

As an example may serve that for the manufacture of a member the composition of which is represented by the formula $Pb(Zr_{0.55}Ti_{0.45})O_3 + 0.32\%$ by weight of MnO, the starting mixture was composed by mixing 33.48 g of PbO, 10.24 g of $ZrO_2$, 5.39 g of $TiO_2$ and 0.258 g of MnO.

The density of the resulting members was always found to be larger than 99 percent of the theoretical density. The average diameter of the crystallites in the members was between 2 and 3 m $\mu$.

For determining the above-mentioned quantities $K_r$, $Q_m$, $\xi$ and $f_r$, disc-shaped, circular members (wafers) were manufactured (0.4 mm thick, 5.3 mm diameter). After polishing, silver electrodes (5.0 mm diameter) were provided by vapor-depositing silver in a vacuum. The wafers were polarized with 5 kV/mm for 5 minutes (in silicon oil of 120° C), and exposed to said voltage during cooling. The determination of the quantities $K_r$, $Q_m$, $\xi$ and $f_r$ in the resonators thus manufactured was always carried out in three wafers of the same composition. A value stated in the tables below gives the average of the three determinations. All the measurements were carried out at room temperature 24 hours after polarization. For determining the ageing ($A$) the resonant frequency $f_r$ was determined once again ten days after polarization.

The measurement of the dielectric constant $\xi$ was carried out at 16 kc/s and 0.5 volts. The resonant frequency $f_r$ and the antiresonant frequency $f_a$ were determined for the radial direction; the resulting values for $f_r$ and $f_a$ were used for calculating the electromechanical coupling factor $K_r$ for the radial direction and for calculating the electromechanical quality factor $Q_m$. The ageing $A$ was determined by measuring the resonant frequency on the first day ($f_{r1}$) and on the tenth day ($f_{r10}$) after polarization to calculate the value $A = f_{r10} - f_{r1}/f_{r1}$.

Table I gives the values found for Kr, Qm, $\xi$ and $A$ for wafers of the composition Table I $Pb(Zr_{0.52}Ti_{0.48})O_3 + y\%$ by weight of MnO

| $y$ | $K_r$ | $Q_m$ | $\xi$ | $A$ |
|---|---|---|---|---|
| 0.22 | 56.5 | 950 | 670 | 3.3 |
| 0.26 | 57.5 | 950 | 700 | 1.0 |
| 0.32 | 52.5 | 1230 | 630 | 1.3 |
| 0.39 | 46.0 | 1200 | 615 | 3.2 |

Table II gives the results for wafers of the composition:

Table II $Pb(Zr_{0.53}Ti_{0.47})O_3 + y\%$ by weight of MnO

| $y$ | $K_r$ | $Q_m$ | $\xi$ | $A$ |
|---|---|---|---|---|
| 0.22 | 52.5 | 900 | 550 | 2.3 |
| 0.26 | 52.0 | 1250 | 490 | 1.9 |
| 0.32 | 47.0 | 900 | 520 | 1.4 |
| 0.39 | 46.0 | 1300 | 515 | 2.3 |

Table III gives the results for wafers of the composition:

Table III $Pb(Zr_{0.54}Ti_{0.46})O_3 + y\%$ by weight of MnO

| $y$ | $K_r$ | $Q_m$ | $\xi$ | $A$ |
|---|---|---|---|---|
| 0.22 | 50.5 | 1000 | 485 | 1.7 |
| 0.26 | 51.0 | 1150 | 455 | 1.5 |
| 0.32 | 46.5 | 1150 | 460 | −0.2 |
| 0.39 | 43.0 | 1300 | 500 | 2.3 |

Table IV gives the results for wafers of the composition:

Table IV $Pb(Zr_{0.56}Ti_{0.44})O_3 + y\%$ by weight of MnO

| $y$ | $K_r$ | $q_m$ | $\xi$ | $A$ |
|---|---|---|---|---|
| 0.22 | 47.5 | 1100 | 430 | 1.8 |
| 0.26 | 45.0 | 1200 | 470 | — |
| 0.32 | 45.5 | 1500 | 405 | −0.3 |
| 0.39 | 43.0 | 1600 | 475 | 2.0 |

Table V gives the results for wafers of the composition:

Table V $Pb(Zr_{0.58}Ti_{0.42})O_3 + y\%$ by weight of MnO

| $y$ | $K_r$ | $Q_m$ | $\xi$ | $A$ |
|---|---|---|---|---|
| 0.22 | 44 | 1100 | 400 | 1.9 |
| 0.26 | 44 | 1260 | 375 | 1.8 |
| 0.32 | 41.5 | 1450 | 380 | 0.1 |
| 0.39 | — | 1800 | 420 | 1.9 |

The ceramic piezoelectric materials according to the invention are suitable for use in electromechanical resonators and in particular for use in electromechanical filters. They are also to be considered for use in resonators for ultrasonic detection of objects.

Figure 2:
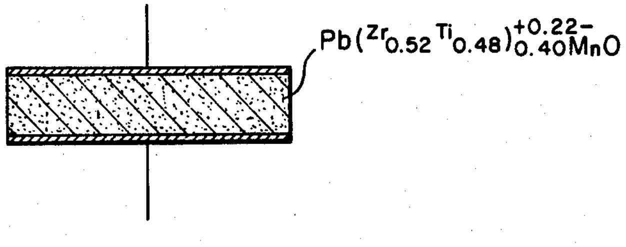

The invention was described with reference to the drawings in which:

FIG. 1 is a graph showing the relationship between the electromechanical quality factor Qm and the MnO content; and FIG. 2 shows a simple filter, or electromechanical resonator, employing as a diaelectric, Pb (Zr0.52 Ti0.48) +0.22–0. 40 MnO.

What is claimed is:

1. An electromechanical resonator consisting of a ceramic piezoelectric member provided with electrodes, said member consisting of an MnO-containing lead zirconate-titanate the composition of which is represented by the formula $Pb(Zr_xTi_{1-x})O_3 + y\%$ by weight of MnO, where $x = 0.52 - 0.58$ and $y = 0.22 - 0.40$.

2. An electromechanical resonator and in particular an electromechanical filter as claimed in claim 1, in which the composition of the ceramic piezoelectric member is represented by the formula $Pb(Zr_xTi_{1-x})O_3 + y\%$ by weight of MnO, where $x = 0.53 - 0.56$ and $y = 0.22 - 0.40$.

3. An electromechanical resonator and in particular an electromechanical filter as claimed in claim 1 in which the composition of the ceramic piezoelectric member is represented by the formula $Pb(Zr_xTi_{1-x})O_3 + y\%$ by weight of MnO, where $x = 0.52 - 0.58$ and $y = 0.25 - 0.35$.

4. An electromechanical resonator and in particular an electromechanical filter as claimed in claim 1 in which the composition of the ceramic piezoelectric member is represented by the formula $Pb(Zr_xTi_{1-x})O_3 + y\%$ by weight of MnO, where $x = 0.52 - 0.58$ and $y = 0.30 - 0.35$.

* * * * *